United States Patent [19]

Lorenzo et al.

[11] Patent Number: 4,693,546
[45] Date of Patent: Sep. 15, 1987

[54] GUIDED-WAVE OPTICAL POWER DIVIDER

[75] Inventors: Joseph P. Lorenzo, Stow; Richard A. Soref, Newton Centre, both of Mass.

[73] Assignee: The United States of America as represented by the Secretary of the Air Force, Washington, D.C

[21] Appl. No.: 831,902

[22] Filed: Feb. 24, 1986

[51] Int. Cl.⁴ .............................................. G02B 6/10
[52] U.S. Cl. ............................ 350/96.13; 350/96.14; 350/96.15
[58] Field of Search ............... 350/96.11, 96.12, 96.13, 350/96.14, 96.15

[56] References Cited

U.S. PATENT DOCUMENTS

| | | | |
|---|---|---|---|
| 3,810,688 | 5/1974 | Ballman et al. | 350/96 WG |
| 3,837,728 | 9/1974 | Logan et al. | 350/96 WG |
| 3,883,220 | 5/1975 | Taylor | 350/96 WG |
| 3,953,620 | 4/1976 | Chandross et al. | 427/53 |
| 4,003,629 | 1/1977 | Baues et al. | 350/96 C |
| 4,008,947 | 2/1977 | Baues et al. | 350/96 C |
| 4,013,000 | 3/1977 | Kogelnik | 350/96 C |
| 4,120,560 | 10/1978 | Baues et al. | 350/96.14 |
| 4,130,342 | 12/1978 | McMahon | 350/96.14 |
| 4,262,992 | 4/1981 | Berthold, III | 350/96.14 |
| 4,420,873 | 12/1983 | Leonberger et al. | 29/576 E |
| 4,472,020 | 9/1984 | Evanchuk | 350/96.12 |
| 4,609,252 | 9/1986 | Wong et al. | 350/96.34 X |

OTHER PUBLICATIONS

Neyer, A., "Electro-Optic X-Switch Using Single-Mode Ti:LiNbO₃ Channel Waveguides", *Electronic Letters*, 7 Jul. 1983, vol. 19, No. 14, pp. 553, 554.
Neyer et al., "Single-Mode Electrooptic X-Switch for Integrated Optic Switching Networks", Second European Conference on Integrated Optics, Florence, Italy, *Conf. Proceedings*, pp. 136-139, 1983.
Neyer, Andreas, "Operation Mechanism of Electrooptic Multimode X-Switches", *IEEE Journal of Quantum Electronics*, vol. QE-20, No. 9, Sep. 1984, pp. 999-1002.
Mikami, O. et al., "Waveguided Optical Switch in InGaAs/InP Using Free-Carrier Plasma Dispersion", *Electronics Letters*, 15 Mar. 1984, vol. 20, No. 6, pp. 228, 229.
Nakajima, H. et al., "Bipolar Voltage Controlled Optical Switch Using Ti/LiNbO₃ Intersecting Waveguides", Fourth Int. Conf. on Integrated Optics and Fiber Optic Communications (IOOC '83), Tokyo, Japan, *Conf. Proc.*, pp. 364, 365.
Pearce, C. W., Chapter 2, "VLSI Technology", edited by S. M Sze, McGraw Hill, N.Y., 1983.

*Primary Examiner*—Eugene R. LaRoche
*Assistant Examiner*—James C. Lee
*Attorney, Agent, or Firm*—Jacob N. Erlich; Donald J. Singer

[57] ABSTRACT

A guided-wave optical power divider having a body made entirely of crystalline silicon and wherein the crossover region of intersecting light guiding channels is doped with a predetermined amount of impurities. By appropriate use of impurities it is possible to create permanent optical power dividers in which a light beam is preselectively directed to follow a preselected path.

16 Claims, 6 Drawing Figures

UNDOPED CONDITION     DOPED CONDITION

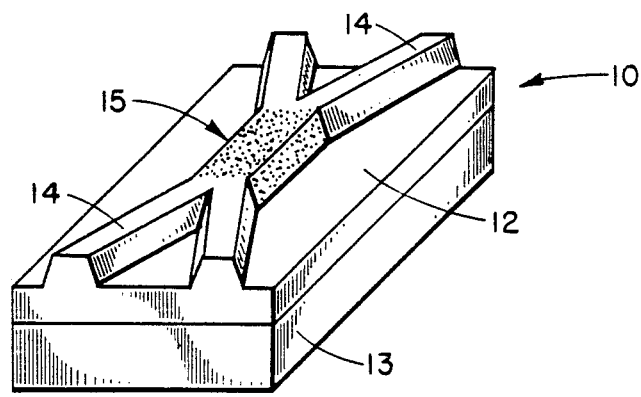
FIG. 1
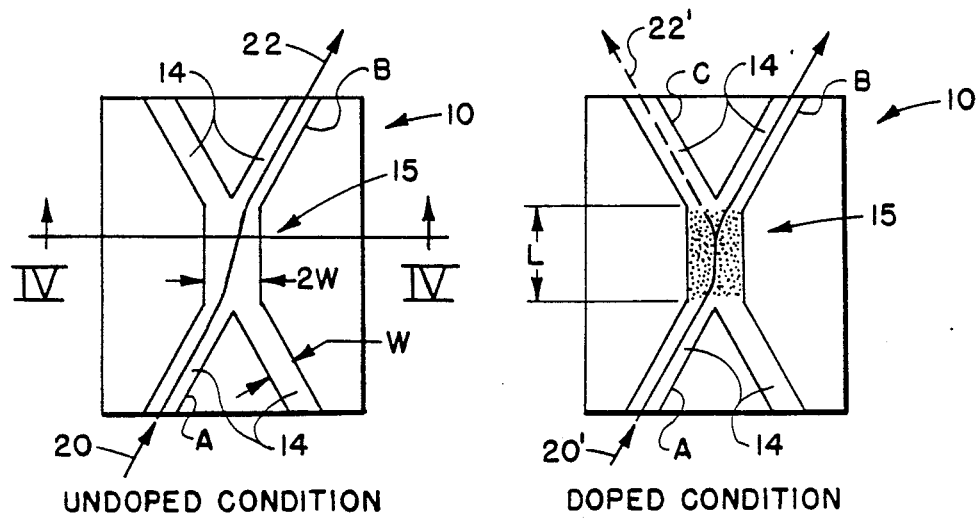
UNDOPED CONDITION
FIG. 2
DOPED CONDITION
FIG. 3
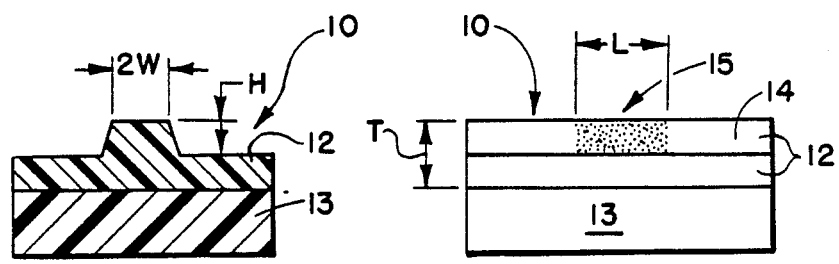
FIG. 4
FIG. 5

GUIDED-WAVE OPTICAL POWER DIVIDER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical systems and the components making up such systems, and, more particularly, to a guided-wave optical power divider in which an optical path is permanently altered based upon the impurity doping of the semiconductor body of the power divider.

With recent increased development of lasers and optical fibers, more attention has been directed to integrated optical systems or circuits and the components which make up these circuits. Particular concern has been directed to the area of optical communcations which operate at a wavelength of 1.3 $\mu$m and beyond and the optical components such as couplers which are utilized therein. Since it has been recognized that optical components are capable of coupling efficiently to single-mode optical fibers, such optical components (couplers) become essential parts of fiber optic communication networks devoted to telecommunications or data communications applications.

More specifically, in a network of single-mode optical fibers, it is often desirable to distribute the optical signals from one set of fibers to a second set of fibers in a prescribed way. This can be accomplished with a planar integrated-optical component coupled to both sets of fibers. A typical prior art component for this purpose is a network of channel waveguides in the form of a series of directional couplers. Each coupler typically uses parallel channels with micron sized separation (spacing) and evanescent-wave coupling. At each coupler in the network, the amount of coupling (that is, the signal division) is determined by the channel spacing and the interaction length, both of which are governed by the photolithographic mask used to build the network.

The deficiency of the prior art is that a special new mask is required each time the signal distribution is changed. A precision, customized mask must be designed and generated in order to alter the cross guide coupling at any location (or set of locations) in the network. Furthermore, the position of connecting waveguides between couplers must be changed. It is therefore clearly evident that a need exists for improved optical couplers which do not require custom masks in their fabricaton.

SUMMARY OF THE INVENTION

The present invention overcomes the problems encountered in the past and as set forth in detail hereinabove by providing an optical component, more specifically, a guided-wave optical power divider which is made of a crystalline silicon semiconductor material and designed in a waveguide pattern and divided with variable doping. By providing a series of identical bodies and altering the doping relationship between the waveguide structure contained therein, the power divider of the present invention can rapidly and easily fix the desired optical signal distribution in the semiconductor material by setting the doping strength at each cross-guide coupling location.

More specifically, the guided-wave optical power divider of the present invention is in the form of a 2×2 or 1×2 optical circuit. These 2×2 and 1×2 optical circuits are the basic building blocks from which a more complex optical network such as a 4×4 or 1×8 network can be constructed. The 2×2 circuit is made up of two intersecting channel waveguides, each of which is a single mode guide for the infrared (0.85, 1.3, 1.55 $\mu$m wavelength region). The intersection angle of a 2×2 circuit is generally 2 degrees or less while the 1×2 optical circuit is a Y-shaped connection of three single mode channels.

Reference is made to the more common 2×2 optical circuit which has two distinct states therein. The first state occurs in the undoped condition when light entering the first channel remains in the first channel and the light entering the second channel remains in the second channel. The second state involves the complete exchange of infrared energy (light) between the channels. In this instance the light from the first channel goes into the second channel at the intersection of the waveguide structure while the light entering the second channel goes to the first channel. This exchange of optical signals is produced by an appropriate doping density within the intersection region of the waveguide structure and by an appropriate length for this intersection region. By using lesser doping, one can obtain a partial division of the light rather than an either/or condition.

The interesting feature of the optical fiber power divider of the present invention is that it produces an optical circuit which is permanent and the optical device is completely passive. That is, in both its initial and final state no electrical power is required. Furthermore, it should be noted that the 2×2 optical circuit is optically reciprocal, that is, the input ports and output ports may be interchanged so that the device will function in the reverse direction.

The impurity doping technique utilized with the present invention is provided by diffusion or by ion implantation techniques. Due to the passive nature of the path selection within the present invention, it is possible to encode an entire matrix of optical channel nodes during the doping phase of the procedure. Specific intersections can be doped or not doped, that is, they can be tailored to produce a coded optical output. The guided-wave optical power divider of the present invention solves many problems heretofore in existence by selecting infrared (light) signal paths in channel waveguides. More specifically, it solves the problem of creating optical components for signal processing in a monomode guiding circuit as well as solving the problem of having to use power switching devices to accomplish these ends.

It is therefore an object of this invention to provide a passive, non-electrical, guided-wave optical power divider.

It is a further object of this invention to provide a guided-wave optical power divider made entirely of crystalline silicon.

It is another object of this invention to provide a guided-wave optical power divider which is extremely simple to produce and which overcomes many of the manufacturing drawbacks associated with past optical couplers or power dividers.

For a better understanding of the present invention, together with other and further objects, reference is made to the following description taken in conjunction with the accompanying drawings and its scope will be pointed out in the appended claims.

BRIEF DESCRIPTION OF THE DRAWINGS

FIG. 1 is pictorial representation of the guided-wave optical power divider of the present invention;

FIG. 2 is a plan view of the guided-wave optical power divider of the present invention in its undoped condition;

FIG. 3 is a plan view of the guided-wave optical power divider of the present invention in its doped condition;

FIG. 4 is a cross-sectional view taken along line IV—IV of FIG. 2 of the guided-wave optical power divider of the present invention;

FIG. 5 is a side view of the guided-wave optical power divider of the present invention.

DETAILED DESCRIPTION OF THE PREFERRED EMBODIMENTS

Figure 6:
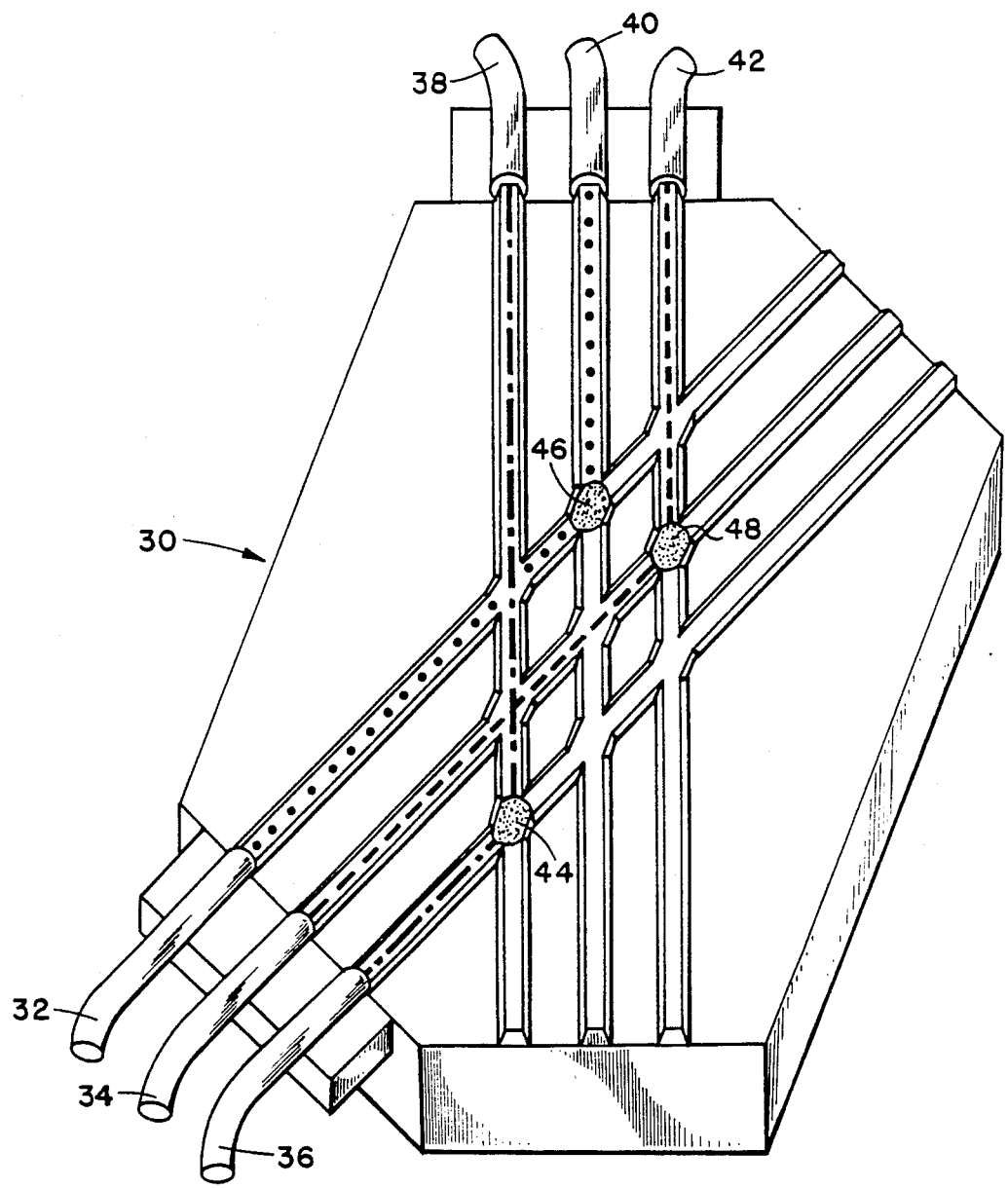
FIG. 6 is a pictorial representation of a complete optical signal-distributon structure made up of nine guided-wave optical power dividers of the present invention plus a plurality of interconnecting channels.

Reference is now made to FIGS. 1–5 of the drawings in which the guided-wave optical power divider 10 of the present inventon is clearly illustrated. The optical power divider 10 of this invention is particularly well suited for fabrication entirely of crysalline silicon. More specifically, power divider 10 is fabricated from a lightly doped single-crystal silicon layer 12 grown epitaxially on a heavily doped crystalline silicon (x-Si) substrate 13. By photolithography and dry etching, the epi-layer 12 is formed into rib waveguides 14 in an intersecting X-like pattern 15.

As illustrated in FIGS. 3–5, the initial doping of epi-layer 12 and substrate 13 is made with impurities such as phosphorous or boron. The initial doping of waveguide region 14 is generally in the range of $10^{14}$ to $10^{17}$ impurities/cm$^3$ while substrate 13 is doped in the range of approximately $10^{19}$ cm$^{-3}$. With the present invention the thickness, T, as shown in FIG. 5 of an epitaxial layer 12 is typically 5–10 microns.

More specifically the input and output waveguides 14 each support only a single mode at the 1.3 or 1.6 $\mu$m wavelength. Each rib waveguide 14 has a width, W, of 5 to 7 microns, an epi thickness, T, of about 6 microns and a rib height, H, of about 3 microns. As clearly shown in FIG. 3 of the drawings the width of the waveguide interception area or region 15 is twice the width of the single-mode input/output guides 14 so that this region will support two guided modes; an even and an odd mode. The length, L, of the intersection region 15 is approximately 0.05 cm.

Crystalline silicon (x-Si) is an excellent semiconductor material to be utilized with the present invention because impurity doping techniques in this material have been extremely well developed over the past thirty years, and because x-Si is an excellent guided-wave medium for transmission at the single-mode fiber wavelengths of 1.3 and 1.55 microns. The guided-wave power divider 10 illustrated in FIGS. 1–5 of the drawings is of a 2×2 configuration. This 2×2 configuration has single-mode channels 14 which intersect at 15 with a double width, 2W. Single-mode optical fibers (not shown) may be end-fire coupled to the waveguide channels 14.

In order to establish the particular path the input light is to travel through channels 14, a proper amount of additional impurities such as boron, phosphorous, antimony, arsenic, protons, etc. are introduced into the intersection region 15 defined by 2WL. With the introduction of the impurities (doping), the waveguide modes are perturbed due to the free carriers thereby introduced (the refractive indicies are perturbed as a result of the free-carrier plasma dispersion effect). As a result, a fraction of the input guided light, approximately 10–20 percent is switched into the cross guide (due to two mode interference) and some of the optical power exits from the second output port.

To illustrate this condition, reference is first made to the undoped condition (i.e., the conditon of basic doping of the epitaxial layer 12 and substrate 13 defined above) illustrated in FIG. 2 of the drawings. In this condition no additional doping of intersection region 15 is effected. As shown therein an input beam of light 20 entering waveguide A is emitted from waveguide B as output 22. In the undoped condition, the expitaxial layer 12, as pointed out above, has a very light basic doping of approximately $10^{14}$ cm$^{-3}$. In that case, the refractive index of the epitaxial layer 12 is approximately $10^{-2}$ higher than that of the substrate 13 which is adequate for guiding of the light beam. Alteration of the path of light beam 20' as illustrated in FIG. 3 occurs when impurities are diffused into the cross-over intersection region 15 by thermal means, for example, or ions are implanted in regon 15.

In order to disturb the waveguide modes it is not necessary that the doping of impurities within intersection 15 extend all the way through the waveguiding layer but, a doping depth of 1 $\mu$m to 3 $\mu$m in a 5 $\mu$m to 7 $\mu$m epitaxial layer 12 would be adequate. Extending the dopant concentration extend through the guide layer would produce a larger perturbation. Typically, a doping density of approximately $10^{18}$ impurities/cm$^3$, which would locally decrease the refractive index by $10^{-3}$, would be sufficient to cross-couple the input beam 20' as shown in FIG. 3 of the drawings. As depicted therein the input beam 20' enters guide A and exits guide C as output beam 22'. The optical propagation loss introduced by the impurities would not be high because L is typically in the order of 0.05 cm while the added absorption is less than 2 cm$^{-1}$.

FIG. 6 of the drawings illustrates a complete optical signal-distribution structure 30 which is made up of nine 2×2 dividers plus a group of interconnecting channels. The planar monolithic structure illustrated in FIG. 6 is coupled to three input fibers 32, 34 and 36 and three output fibers 38, 40 and 42, although it could be operated just as easily with one input fiber and six output fibers, for example. The fibers are end-coupled to the optical signal-distribution structure 30 by precision alignment jigs consisting of, for example, etched V-grooves in a silicon substrate. In the present example, doping has been added to three intersecting regions 44, 46 and 48 of the nine divider elements so as to produce a predetermined optical signal distribution network.

Although this invention has been described with reference to particular embodiments, it will be understood that this invention is also capable of further and other embodiments within the spirit and scope of the appended claims.

We claim:

1. A guided-wave optical power divider, comprising: a body made up entirely of crystalline silicon;

an intersecting channel waveguide structure having a first leg and at least two other legs formed within said silicon body, said legs intersecting to form an intersection crossover region of predetermined size; and said crossover region being doped with a predetermined amount of impurities, said predetermined amount of impurities being sufficient to change the cross-coupling of light between said first leg and said two other legs.

2. A guided-wave optical power divider as defined in claim 1 wherein said predetermined amount of doping impurities within said crossover region is approximately $10^{-18}$ impurities/cm$^3$.

3. A guided-wave optical power divider as defined in claim 2 wherein said crystalline silicon body is formed of an epitaxial layer of crystalline silicon grown on a crystalline silicon substrate.

4. A guided-wave optical power divider as defined in claim 3 wherein said crystalline silicon substrate is doped with impurities in the range of approximately $10^{19}$ cm$^{-3}$.

5. A guided-wave optical power divider as defined in claim 4 wherein said crossover region has the following dimensions: a length of approximately 0.05 cm and a width of approximately 10-14 microns.

6. A guided-wave optical power divider as defined in claim 5 wherein said doping impurities have a doping depth of approximately 3 microns and said crossover region has a depth of approxixately 6 microns.

7. A guided-wave optical power divider as defined in claim 4 wherein said doping impurities are phosphorous.

8. A guided-wave optical power divider as defined in claim 4 wherein said doping impurities are boron.

9. A guided-wave optical power divider as defined in claim 4 wherein said doping impurities are antimony.

10. A guided-wave optical power divider as defined in claim 4 wherein said doping impurities are arsenic.

11. A guided-wave optical power divider as defined in claim 6 wherein said doping impurities are boron.

12. A guided-wave optical power divider as defined in claim 6 wherein said doping impurities are antimony.

13. A guided-wave optical power divider as defined in claim 6 wherein said doping impurities are arsenic.

14. A guided-wave optical power divider as defined in claim 4 wherein said intersection crossover region is of an X-like configuration.

15. A guided-wave optical power divider as defined in claim 14 wherein said legs are each of the same preselected width and said intersection crossover region has a width approximately twice said preselected width.

16. A guided-wave optical power divider as defined in claim 4 comprising a plurality of said intersecting channel waveguide structures interconnected together.

* * * * *